(12) United States Patent
Sivapathasundram et al.

(10) Patent No.: US 8,990,109 B2
(45) Date of Patent: Mar. 24, 2015

(54) INTERFACE MODULE, SYSTEM AND METHOD

(75) Inventors: Sumithran Sivapathasundram, Surbiton (GB); Simon Marsden, Whitstable (GB)

(73) Assignee: Global Refund Holdings AB, Moelndal (SE)

(*) Notice: Subject to any disclaimer, the term of this patent is extended or adjusted under 35 U.S.C. 154(b) by 0 days.

(21) Appl. No.: 13/257,385

(22) PCT Filed: Mar. 17, 2010

(86) PCT No.: PCT/GB2010/050457
§ 371 (c)(1),
(2), (4) Date: Sep. 19, 2011

(87) PCT Pub. No.: WO2010/106365
PCT Pub. Date: Sep. 23, 2010

(65) Prior Publication Data
US 2012/0011008 A1     Jan. 12, 2012

(30) Foreign Application Priority Data
Mar. 20, 2009    (GB) .................................. 0904877.8

(51) Int. Cl.
G06Q 20/00 (2012.01)
G06F 3/00 (2006.01)
G06F 13/12 (2006.01)
G06Q 20/20 (2012.01)
G06Q 20/10 (2012.01)
G06Q 30/06 (2012.01)

(52) U.S. Cl.
CPC ................ *G06Q 20/20* (2013.01); *G06Q 20/10* (2013.01); *G06Q 30/06* (2013.01)

USPC ................................ 705/16; 719/321; 710/62

(58) Field of Classification Search
USPC ............................................................. 705/16
See application file for complete search history.

(56) References Cited

U.S. PATENT DOCUMENTS

| | | | | |
|---|---|---|---|---|
| 6,061,557 A | * | 5/2000 | Lazaridis et al. | 455/406 |
| 6,065,679 A | * | 5/2000 | Levie et al. | 235/462.47 |
| 6,415,341 B1 | * | 7/2002 | Fry et al. | 710/62 |
| 7,133,939 B1 | * | 11/2006 | Desai et al. | 710/11 |
| 7,167,924 B1 | * | 1/2007 | Symonds et al. | 709/246 |

(Continued)

OTHER PUBLICATIONS

Patent Examination Report in Australian Patent Application No. 2010224629 dated Feb. 19, 2014, 3 pages.

(Continued)

*Primary Examiner* — Matthew Gart
*Assistant Examiner* — Ashford S Hayles

(57) ABSTRACT

An interface module is provided for a sales processing system that facilitates the integration of a payment system and external systems with the sales processing system. In one implementation, the interface module includes a first interface configured to support a first protocol for communication with a sales processing module of the sales processing system, a second interface configured to support a second protocol for communication with a payment system, and a third interface configured to support a third protocol for communication with a transaction system for external services. The interface module further includes a controller operable to control routing of messages between the first, second and third interfaces, and reformatting of the messages in accordance with the first, second and third protocols, respectively.

16 Claims, 5 Drawing Sheets

(56) References Cited

U.S. PATENT DOCUMENTS

| | | | |
|---|---|---|---|
| 7,529,868 B2* | 5/2009 | Brooks et al. | 710/62 |
| 8,225,333 B2* | 7/2012 | Ng et al. | 719/321 |
| 8,556,174 B2* | 10/2013 | Kosecki et al. | 235/449 |
| 8,621,123 B2* | 12/2013 | Caballero | 710/62 |
| 8,806,508 B2* | 8/2014 | Ng et al. | 719/316 |
| 2001/0025882 A1* | 10/2001 | Coulier | 235/380 |
| 2003/0110386 A1* | 6/2003 | Stolwijk | 713/189 |
| 2004/0128201 A1 | 7/2004 | Ofir et al. | |
| 2005/0005190 A1* | 1/2005 | Ofir et al. | 714/4 |
| 2005/0006468 A1* | 1/2005 | Fandel et al. | 235/383 |
| 2005/0154674 A1* | 7/2005 | Nicholls et al. | 705/43 |
| 2006/0015646 A1* | 1/2006 | Ogilvy | 709/238 |
| 2007/0005685 A1* | 1/2007 | Chau et al. | 709/203 |
| 2007/0276763 A1* | 11/2007 | Kleinman et al. | 705/64 |
| 2008/0065550 A1* | 3/2008 | Zhu et al. | 705/51 |
| 2008/0086417 A1* | 4/2008 | Bykov et al. | 705/40 |
| 2009/0144456 A1* | 6/2009 | Gelf et al. | 710/8 |
| 2009/0177579 A1* | 7/2009 | Ling | 705/39 |
| 2010/0159907 A1* | 6/2010 | Farley et al. | 455/418 |
| 2011/0047073 A1* | 2/2011 | Cleary et al. | 705/39 |
| 2012/0005324 A1* | 1/2012 | Villoslada de la Torre et al. | 709/223 |
| 2012/0254897 A1* | 10/2012 | Ng et al. | 719/321 |

OTHER PUBLICATIONS

Notification of the Fourth Office Action in Chinese Application No. 201080013585.0 mailed May 6, 2014, 6 pages.

* cited by examiner

INTERFACE MODULE, SYSTEM AND METHOD

BACKGROUND

The invention relates to an interface module for a sales processing system and to a system and method using such a module.

It is known that many different sales processing systems are available on the market from various manufacturers. Sales processing systems can be used in many different environments for making and recording purchase transactions. Such sales processing systems can include so-called point of sales (POS) systems or electronic cash registers as used, for example, in restaurants or retail establishments, or so-called property management systems as used, for example in hotels, or payment gateway systems, for example. Such sales processing systems typically integrate with sales processing server systems that are connected to a number of such sales processing server systems. It should be noted that different terminologies used in the sales environment as will be apparent from the above discussion.

The expression or term "sales processing system" as used herein relates to a device, system or apparatus that is responsible for conducting sales in an retail or other sales environment, and is distinct from a payment system or payment terminal that is used to manage payment card (e.g. credit and/or debit card) transactions. A sales processing system is typically arranged to interact with a payment system to effect payments using payment cards. The reason for the separation between the sales processing system and the payment system is to provide security in respect of the payment card transaction. There are many different types of payment systems available on the market. The payment systems are configured to communicate with remote acquiring hosts that provide financial services.

In order to enable sales processing systems and payment systems to work together, it has been necessary to provide specific programming of the sales processing systems and devices to be able to integrate with the payment systems.

An important part of the integration of payment systems with sales processing systems is to provide sufficient separation of the functionality of the respective systems to achieve financial regulatory and security requirements. Providing suitable programming is an expensive and time consuming process.

Also during the operation of such systems, if changes become necessary due, for example, because of a change in the supplier of the financial services from one bank to another, then an expensive and time consuming reprogramming of the sales processing systems becomes necessary. This can be time consuming and expensive, not only because the modification of a single sales processing system can be complex, but also because a company may be using a number of different models and versions of one or more sales processing systems in one or more stores.

In addition, so companies may also wish to provide additional services such as tax free shopping services, or direct currency conversion services using the sales processing systems. In view of this integration with yet further external systems may be needed.

The present invention seeks to at least mitigate at least some of these problems.

SUMMARY

An aspect of the present invention provides an interface module for a sales processing system, the interface module comprising: a first interface configured to support a first protocol for communication with a sales processing module of the sales processing system; a second interface configured to support a second protocol for communication with a payment system; a third interface configured to support a third protocol for communication with a transaction system for external services; and a controller operable to control routing of messages between the first, second and third interfaces, and reformatting of the messages in accordance with the first, second and third protocols, respectively.

In an embodiment of the invention, the interface module is dynamically configurable in response to an initialisation or configuration request, whereby the interface module is able dynamically to be adapted to a particular implementation. An embodiment of such an interface module is able to provide a universal interface configurable for providing communication between different examples of sales processing systems, payment systems and transactions systems.

A mapping module can be provided that includes a schema engine and mapping information, the controller module being operable forward a message received from one of the first, second and third interfaces to the schema engine, and the schema engine being operable to reformat the received message based on the mapping information to generate a reformatted message, the controller module being further configured to forward the reformatted message based on the reformatting. In an embodiment of the invention, the mapping module is dynamically configurable based on information provided from a configuration host system.

Another aspect of the invention provides a sales processing system comprising a sales processing module configured to conduct sales processing and such an interface module, the sales processing module being configured to support the first protocol for communication with the interface module.

A further aspect of the invention provides a combined system comprising such a sales processing system and a payment system operationally connected to the sales processing system via the second interface module.

A further aspect of the invention provides a method of operating a sales processing system, the sales processing system including such a communication interface module and the method comprising controlling, using a controller module, routing of messages between first, second and third interface modules including reformatting of the messages in accordance with first, second and third protocols, respectively, wherein the first interface module supports a first protocol for communication with a sales processing module of the sales processing system, the second interface module supports a second protocol for communication with a payment system and the third interface module supports a third protocol for communication with a transaction system for external services.

An embodiment of the interface module can be implemented as computer program product comprising program code operable to control a processor of a sales processing system to carry out such a method.

Although various aspects of the invention are set out in the accompanying claims, other aspects of the invention include any combination of features from the described embodiments and/or the accompanying dependent claims with the features of the independent claims, and not solely the combinations explicitly set out in the accompanying claims.

BRIEF DESCRIPTION OF THE DRAWINGS

Embodiments are described, by way of example only, with reference to the accompanying drawings.

DETAILED DESCRIPTION

Figure 1:
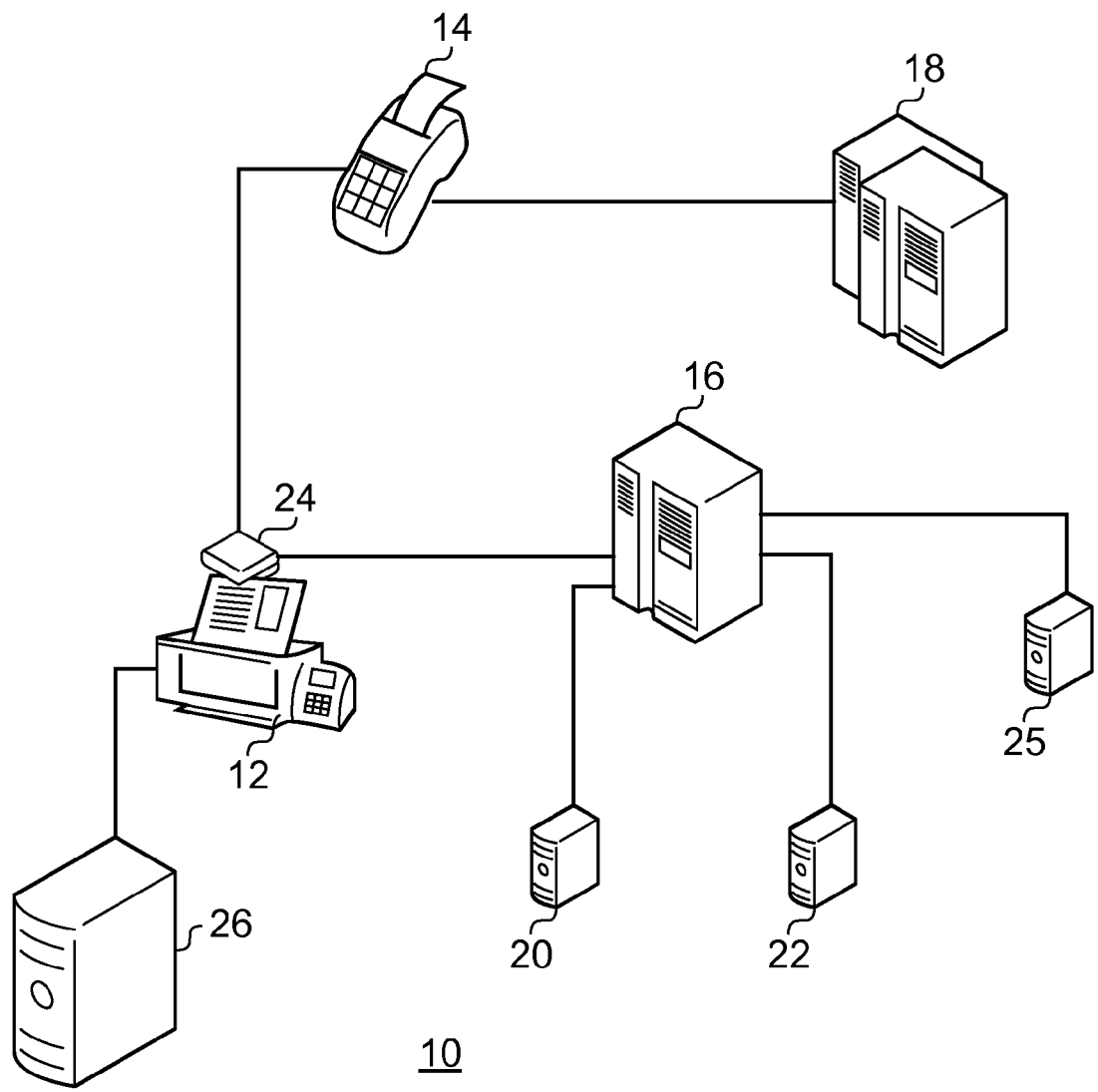
FIG. 1 is a schematic representation of an example of a combined system for providing sales processing and payment services.

FIG. 1 is schematic overview of a system architecture 10 that includes a sales processing system 12, implemented, for example, by a sales processing terminal (for example an electronic cash register (ECR)), that is in communication with a payment system 14 and a transaction system 16. The payment system 14 can be in the form of a payment terminal for reading a card or other payment authorisation device and can be operable securely to transmit the card details and a payment amount to one or more bank systems 18 for payment processing. In the example shown in FIG. 1, the transaction system 16 can be in communication with a direct currency conversion (DCC) host system 20 for direct currency conversion processing and/or a tax free shopping (TFS) host system 22 for TFS processing. As is further illustrated in FIG. 1, the sales processing system 12 is provided with an interface module 24 that is operable to provide a configurable interface that facilitates the connection of a payment system 14 and also provides for service requests to be sent to, and service responses to be received from, the transaction system 16.

The interface module 24 is referred to herein as a communication interface module to differentiate the interface module 24 from component interface modules to be described later that form part of the communication interface module 24. In this regard, it is to be noted that the term "communication interface module" is used as a label to identify the interface module 24. The communication interface module 24 is configured, as will be described later, to provide for flexibility in the configuration of the connection of the sales processing system 12 to the payment system(s) 14 and to the transaction system(s) 16. A configuration host system 25 is operable to provide configuration information for configuring the communications interface module 24.

Figure 2:
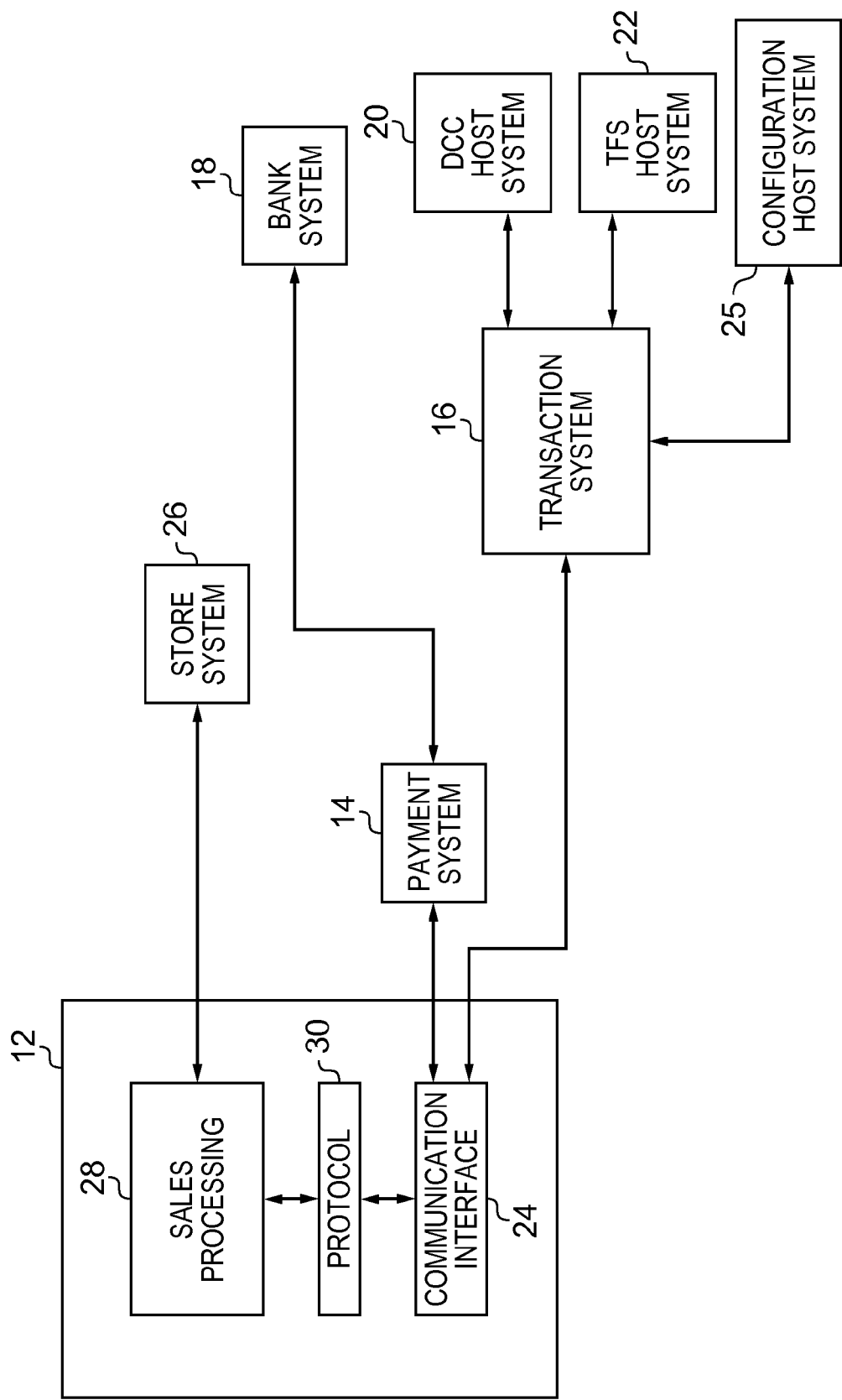
FIG. 2 is a schematic block diagram illustrating an example of functional elements of the system of FIG. 1.

FIG. 1 also illustrates a further system 26, for example a Electronic Point of Sale (EPOS) control system 26 in a store that can include one or more computer servers and can communicate with a plurality of sales processing systems such as the sales processing system 12 shown in FIG. 2 and can integrate with other external systems (not shown).

Communication between the sales processing system 12 and the payment system 14 can be implemented using a terminal specific interface protocol operating over, for example, one or more of a serial link such as an RS232 link or a universal serial bus (USB) link and/or a transmissions control protocol/internet protocol (TCP/IP) link. Communication between the sales processing system 12 and the transaction system 16 can be implemented using a mark-up protocol (e.g. HTTP(S)) over a TCP/IP link. The connection between the sales processing system and the store EPOS control system can also be implemented using a mark-up language protocol (e.g. HTTP(S)) over a TCP/IP link).

It should be noted that the architecture described with reference to FIG. 1 represents one example of the application of a communication interface module 24. The communication interface module 24 can be configured so that it can be hosted on a local server to which an electronic cash register is connected, or on a central server to which a plurality of electronic cash registers are connected, or it could be hosted externally on a remote server which provides services to, for example, a chain of retailers. Indeed, the communication interface module 24 can be configured dynamically using the configuration host 25 as will be described later, which enables it to be implemented in any number of different scenarios. In the following the example application described with reference to FIG. 1 will be described in more detail.

FIG. 2 is a functional block diagram illustrating an example configuration of the system architecture 10 of FIG. 1.

The sales processing system 12 can be a programmable sales processing terminal supplied by one of a number of manufactures. Such a sales processing system 12 is typically formed from a dedicated personal computer (PC) system which includes peripherals specific for a sales processing terminal such as a display configured to display sales processing information, a keypad designed for a sales processing system and/or a touch sensitive screen for the display configured as a keypad, a printer and other external interfaces such as a BAR code reader, a card reader, etc. Such a sales processing system 12 typically operates using a version of a conventional operating system. The sales processing system 12 typically also supports a version of Java runtime environment (JRE), for example the Java Standard Edition (Java is a trademark of Sun Microsystems, Inc), with a version of 1.5 or later.

FIG. 2 illustrates various modules provided in the sales processing system 12. The various modules can be implemented by means of software and/or firmware held in storage in the sales processing system 12 and operable to control one or more processors of the sales processing system 12. The modules can include a sales processing module 28 that controls the processor(s) of the sales processing system 12 to perform processing at the sales processing system 12 and for communication with the store system 26.

An embodiment of the invention as illustrated in FIG. 2 includes an example of a communication interface module 24 that interfaces with the sales processing module 28 using a first interface protocol 30, called herein a sales processing interface protocol 30, and provides a sales processing proxy for interfacing with the payment system 14 and the transaction system 16 using the appropriate communication protocols. The sales processing module 28 is configured to use the protocol 30. The communication interface module 24 can then be used with any sales processing system 12 for which the sales processing module 28 has been configured to support the sales processing interface protocol 30. This means that the communication interface module 24 is portable between different sales processing systems 12 manufactured by different manufacturers. The communication interface module 24 effectively acts as a "Y-splitter", or proxy, and extends the communication with the payment system 14 to exchange TFS and DCC status queries with the transaction system 16. The communications interface module 24 also serves to keep credit and debit card information, as used, for example, on the payment system 14, separate from the sales processing module 28.

Figure 3:
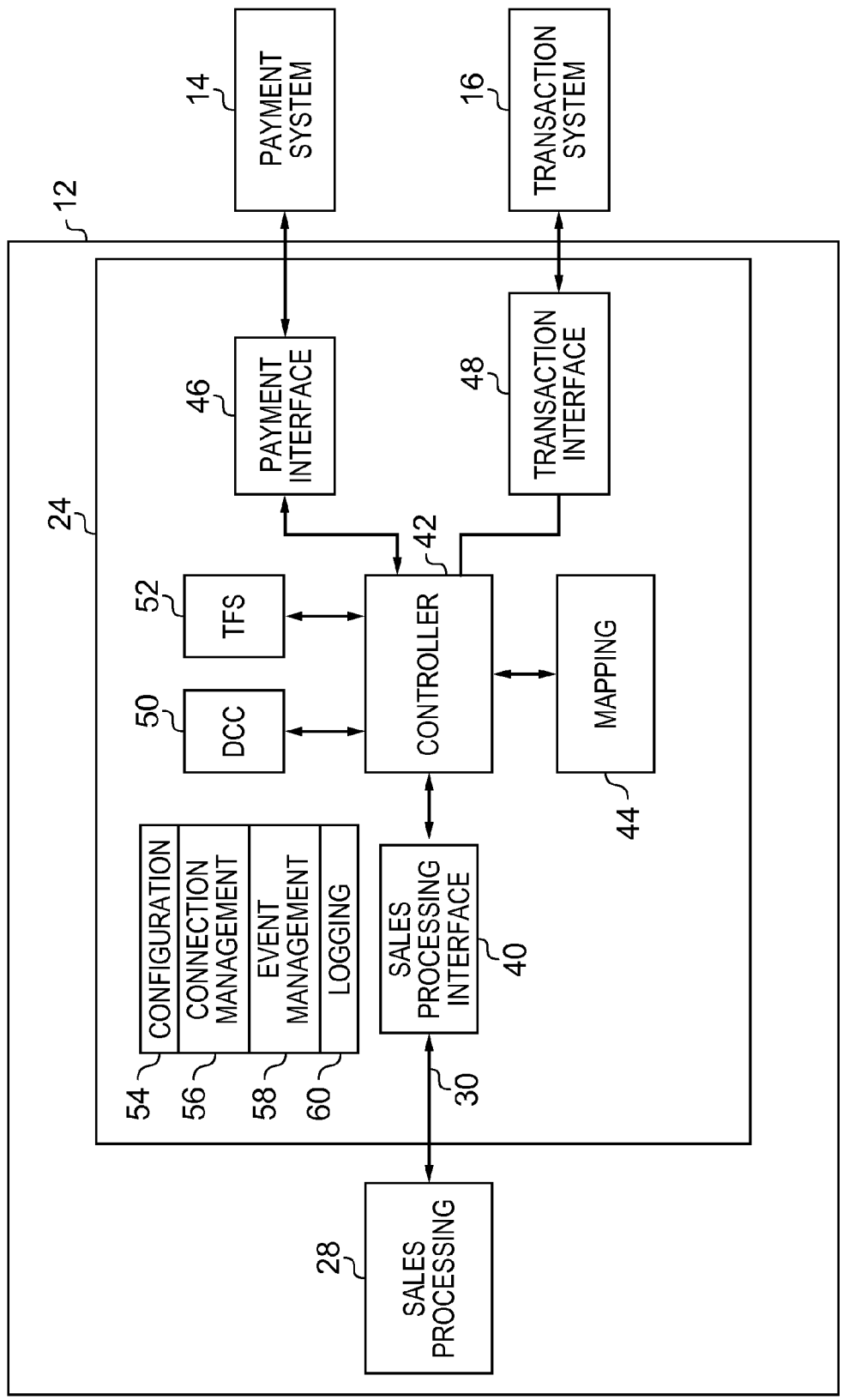
FIG. 3 is a schematic block diagram illustrating in more detail some of the functional elements shown in FIG. 2.

FIG. 3 illustrates an example configuration of the communication interface module 24 in more detail.

A first component interface module 40 forms a sales processing interface module that implements a first interface protocol 30 (the sales processing system interface protocol 30) to interface with the sales processing module 28. A second component interface module 46 forms a payment interface module for interfacing with the payment system, or terminal 14 using a second interface protocol. A third component interface module 48 forms a transaction interface module for interfacing with the transaction system 16 using a third interface protocol. In the present example the first second and third interface protocols are each different. However, in another example, two or all of the interface protocols may be the same as each other. A controller module 42 provides routing logic to route messages through the system, isolating the other components from each other, using mapping information held in mapping module 44.

A DCC module 50 can be provided for providing DCC processing at the sales processing system 12 and a TFS module 52 can be provided for providing TFS processing at the sales processing system 12.

The DCC module 50 can provide a simple GUI, which offers several currencies to a user. The user can then decide a currency to be used for payment. The DCC module 50 can be operable to obtain the amount of a transaction in a local currency and to send a message to the DCC host 20 via the communication interface module 24 and the transaction system 16 to obtain an appropriate exchange rate. The DCC module 50 can be operable to display a converted amount calculated at the DCC module 50 based an exchange rate received from the DCC host system 20, or be provided with a response from the DCC host system 20, via the transaction system 16 and the communication interface module 24.

The TFS module 52 can provide a GUI to display a form to capture user details and to display purchase details. It can then be operable to send a message to the TFS host 22 via the communication interface module 24 and the transaction system 16. A response message received by the TFS module 52 from the TFS host system 22, via the transaction system 16 and the communication interface module 24, can include a TFS cheque or voucher, which can be printed at the sales processing system 12.

It should be noted that DCC logic and/or TFS logic can be implemented as part of the sales processing module 28. However, by providing the DCC module 50 and/or the TFS module 52 as part of the communication interface module 24, DCC and/or TFS functionality can be provided for a sales processing system 12 that does not have DCC logic and/or TFS logic as part of the sales processing module 28.

Various other components are illustrated in FIG. 3. A configuration API module 54 is operable to provide an API for product development and testing. A connections management module 56 is operable to manage low-level communications objects. An event management module 58 is operable to provide for the handling of timers, exceptions and other "abnormal" events in a centralised manner that integrates closely with the operation of the controller module 42. A logging module 60 provides for the logging of operations to facilitate deployment time configuration.

Figure 4:
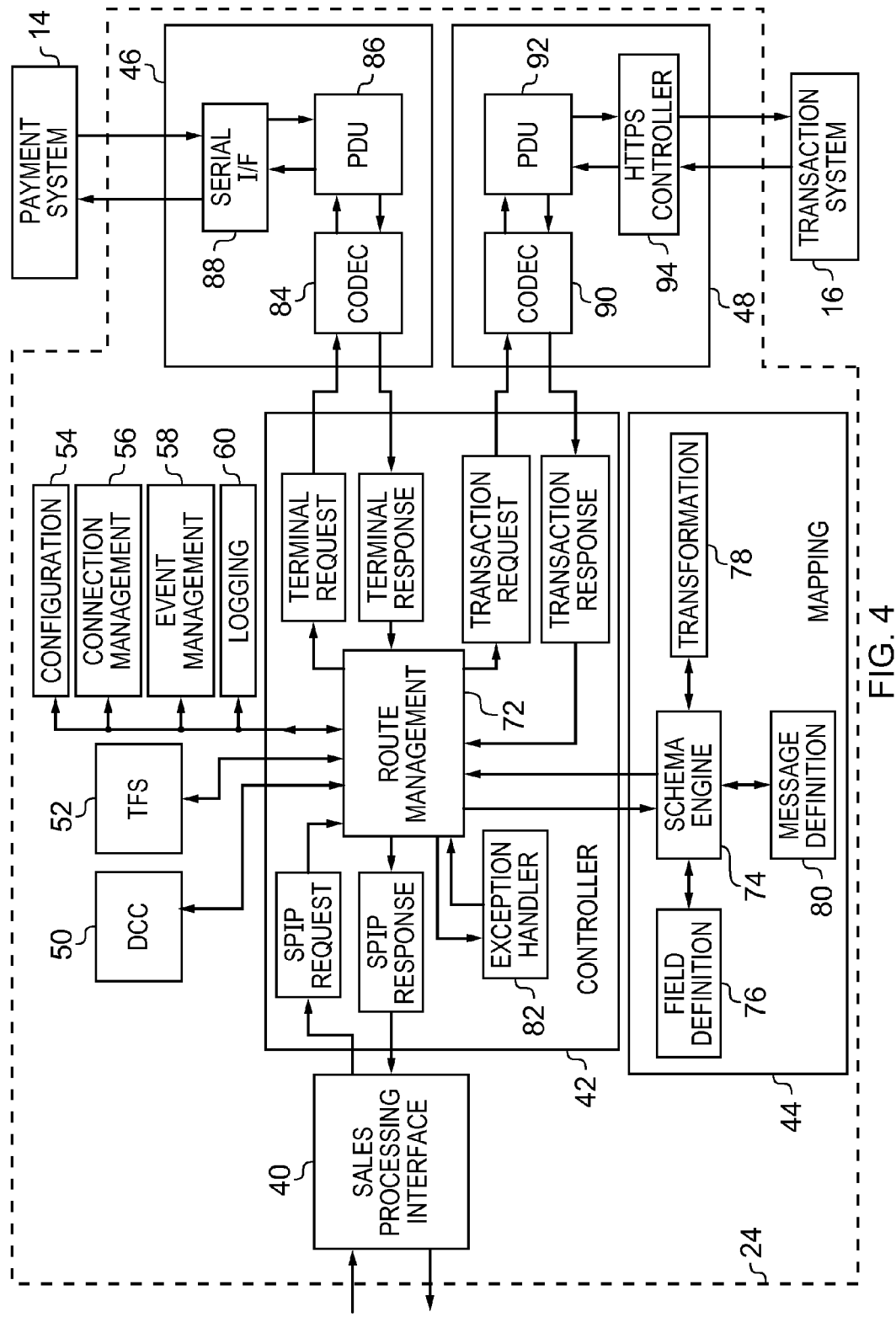
FIG. 4 is a schematic block diagram illustrating in more detail some of the functional elements shown in FIG. 3.

FIG. 4 is a schematic block diagram illustrating the interaction of the controller module 42, the mapping module 44, the payment interface module 46 and the transaction interface module 48 in more detail. These modules work together provide an abstraction layer and the ability to dynamically map one interface to another, to provide flexible routing and to provide data management as required, for example, to meet the Payment Card Industry Data Security Standard.

The sales processing interface module 40 accepts a message configured in accordance with the sales processing interface protocol (SPIP) and sends it on to the controller module 42 as a SPIP request message. The SPIP request message includes a SPIP header that can include, inter alia, a message identifier (ID) and key value. These parameters are used for dynamic routing. The controller module 42 includes a route management (router) module 72 that inspects the SPIP request message 102 and sends it to the mapping module 44. A schema module 74 forms a schema engine that can be configured in the mapping module 44 inspects the SPIP message ID and performs mapping operations based on the SPIP request message ID and mapping information held in the mapping module 44. For example, the schema module 74 can use a field definition module 76 to provide for data type handling and a transformation engine 78 can manage a message transformation before passing the message back to the route management module 72 for further message flow control.

The route management module 72 is operable to read the combination of header IDs to determine a routing sequence and to create different message classes to suit the protocols that are necessary for a given setup (based on an initialisation message (ECRInit) to be described later) and to interact with the mapping module 44 for formulating an appropriate message composition. The mapping module 44 will be discussed later. After an appropriate output message is formulated using the mapping module 44, then the message is transmitted for onward processing. Messages typically require multiple steps though the routing module 72 to complete an overall message session. A message session is made up of multiple internal messages between module 72 and other modules as illustrated in FIG. 4. Each message will include the origination source ID (POSID). This ID facilitates maintaining a context and also invokes an appropriate external system or systems that are associated with the sales processing system 12.

The mapping module 44 can inspect a received message and use command patterns for different SPIP message types including respective commands having a respective class types. Each command type can have its own schema, which maps attribute/parameter names to protocol field types. Each command can have a request and, when executed, a response. A request can thus be implemented a subclass of a SPIP message class, with request type specific parameters. When a command has been executed, a response can be provided that holds all of the response data, as defined by a response schema, obtained from the schema engine 74.

The message definition module 80 can have message types entries accessed based on a message identifier retrieved from a received message, the message type entries defining respective message types. Common message definitions are stored in a message definitions module 80 with all specific messages, whether requests or responses. Schema definitions enable each message to be assigned a schema including a collection of mappings to/from unique field identifiers and string names and values.

Field definitions, held in a field definitions component 76, define for each message type whether the message contains zero or more fields and type identifier codes, length definitions and descriptions for the fields. The field definition module 76 can have message field definitions entries accessed based on a message identifier retrieved from a received message and a field identifier from a received message, the message field definition entries defining the content of respective message fields.

The transformation module 78 can have message transformation entries defining message transformations to be performed based on source and destination information retrieved from a received message.

In operation, a route management module 72 of the controller module 42 inspects a message class ID to package it into an appropriate request message. In a typical flow, a first attempt will always be to send the message to the payment interface module 46. Based on a configuration parameter, a next attempt will be to send the message to the transaction interface module 48. Any exceptions are passed to an exceptions handler module 82 for logging (using the logging module 60, FIG. 3) and onward reporting to the originating module. The DCC and TFS modules 50 and 52 are alerted if a DCC and TFS service is required to be performed independently of the sales processing module 28 of the sales processing system 12. Once the DCC and TFS modules 50 and 52 have completed data capture, additional information as captured is passed back to the route management module 72 of the controller module 42 for further action and routing.

The route management module 72 receives configuration and connection parameters from the configuration and connection modules 54 and 56 respectively. Loggable information is sent to the logging module 60. The event handler module 58 manages the timers and queuing control to the route management module 72.

Thus, the schema module 74 that forms the schema engine and the mapping information can be responsive to a message received from one of the first, second and third interfaces 40, 46, 48 and forwarded to the schema engine by the route management module 72, the schema module 74 being operable to reformat the received message based on the mapping information to generate a reformatted message, the controller module 42 being further configured to forward the reformatted message based on the reformatting.

Through the interaction and configuration of the schema engine, the message definitions, the field definitions and the transformation engine, the mapping module is thus able to provide data management as required, for example, to meet the Payment Card Industry Data Security Standard.

In the present example, as shown in FIG. 4, the payment interface 46 can include components that encapsulate payment system messages based on terminal request message class messages received from the controller module 42. A coder/decoder (codec) 84 is operable to convert to and from low level byte buffers suitable for wire level communication. A physical data unit (PDU) 86 can be operable to process low level buffers. A serial interface 88 supports serial communications to the payment system 14. The serial interface 88 applies serial communication framing and provides a stable communication to the external payment system 14.

In the present example, as shown in FIG. 4, the transaction interface 48 encapsulates message formatting for communicating with the transaction system 16. The transaction interface 48 can include a coder/decoder (codec) 94 operable to convert to and from low level byte buffers suitable for device I/O. A physical data unit (PDU) 92 can be operable to process the low level buffers. A HTTP(S) controller 94 can form an HTTP(S) connectively engine and can be operable to support secure socket layer transactions via the Internet with the transaction system 16.

In an example embodiment, the mapping module 44 and other modules in the communication interface module 24 can be configured on initiation of the sales processing system 12 using information from the configuration host system 25 (FIG. 1) which forms an external centralised configuration management system. At the point of implementation, the communication interface module 24 does not need to be initially set up for that implementation. However, when a first initialisation message (ECRInit) is received by the communication interface module 24 with a unique activation code, all the modules can be updated using information from the configuration host system 25 to configure the individual modules of the communication interface module 24 with relevant parameters, definitions, templates as required for that implementation.

In order to start the configuration process, an initialisation request (ECRInit) can be issued from the sales processing system 12 to the communication interface module 24. Such a message can include a message header identifying the message as an initiation request, a point of sale ID for the sales processing system and a payment terminal ID identifying a type of payment terminal associated with the sales processing system. Further information in the initialisation request can include data identifying the input devices (magnetic card reader, ENV card reader, etc.) that are active, whether or not tax free shopping and/or dynamic currency conversion processes are to be active, details of the print format required, etc.

The route management module 72 of the communication interface module 24 can be responsive to receipt of such a message to forward the message to the configuration host system 25 via the transaction system 12 to cause the download of configuration information for configuring the mapping module 44 for the particular configuration required. Different sets of configuration information can be held at the configuration host server 25 and can be accessed by the parameters (the various IDs) provided that identify the various elements (sales processing system, payment system, etc.) of a particular implementation.

As a result an appropriate download of configuration information for configuring the mapping module 44 for the particular configuration required can be achieved. This can include configuring the mapping module 44 to inspect received messages to be expected from the sale processing system and for setting appropriate schemas. The message definition module 80 can be configured with appropriate message type entries. Appropriate field definitions can be stored in the field definitions component 76. Appropriate message transformation entries can be included in the transformation module 78.

In addition, an appropriate tax free shopping module 52 and dynamic currency conversion module 52 can also be downloaded from the configuration host system 25 as required.

By providing initialisation of the interface module 24 from the configuration host system 25 in this manner, it can be ensured that the initialisation module can be optimised according to the latest configuration information available, and this avoids the communication interface module 24 needing to be pre-programmed with all possible configurations in which the communication interface module 24 may be deployed.

The initialisation, or configuration. can be redone at a later time as well to accommodate changes in a configuration (for example if a different model of payment system is associated with the sales processing system, or if new services are added). Initialisation or configuration in this manner thus provides for flexibility in deployment and future proofing by allowing changes dynamically to be accommodated.

In other words, the communication interface module 24 can be configured using configuration information provided from a configuration host system in response to a configuration initialisation request identifying an implementation configuration.

In this way, message types and formats can be added from the configuration host system 25 as required. This facility enables dynamic arrangement of the message definition, field definitions, transformations and schema modules and enables the communication interface module 24 to provide a dynamic and flexible approach to providing for ongoing changes that take place in the payment systems space and also external hosts that change on a regular basis. Key definition data can be updated and configured to work for a given implementation based on an activation code generated on the configuration host system for tagging all the necessary components necessary for that implementation. Changes in data security requirements can readily be addressed. The use of the communication interface module 24 also allows significant flexibility in the provision of data to allow for flexible generation of printed and other receipts by the sales processing system 12, by configuring the information provided to the sales processing system 12 for the printing or production of those receipts.

Although in the present example the configuration host system 25 is connected to the communication interface module 24 via the transaction system 16, in another example the configuration host system 25 could be connected directly to the communication interface system 24 via a direct component interface, using an appropriate interface protocol.

Figure 5:
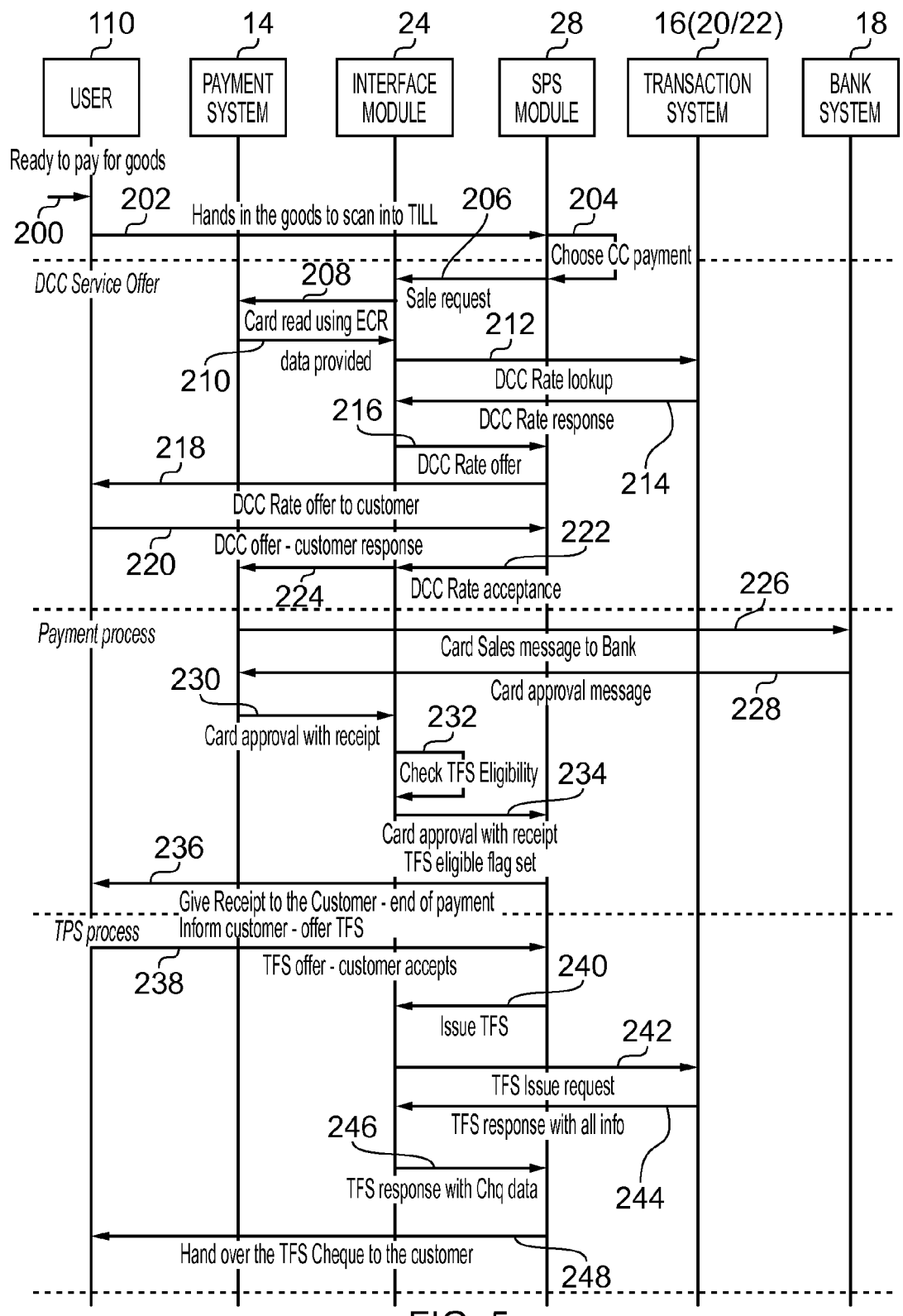
FIG. 5 is a flow diagram illustrating example operations of such a system.

FIG. 5 is a flow diagram various operations performed by the system 10.

At 200, when a user 100 is ready to pay for goods, these are handed 202 to be processed at the sales processing system 12. The sales processing module 26 controls the capture of the details of the goods, for example by controlling a scanner for scanning a bar code.

Assuming that the user chooses to pay by credit card, the sales processing module 28 sends 206 a sales request to the controller module 42 of the communication interface module 24, which forwards 208 an instruction to the payment system 14 to read the user's credit card.

The payment system 14 provides 210 data retrieved from the card to controller module 42 of the communication interface module 24, which passes that data to the DCC module 50. The DCC module 50 can then be operable to send 212 a DCC rate lookup request via the controller module 42 of the communication interface module 24 to the transaction system 16 (and from there to the DCC host 20).

The transaction system 16 can then be operable to return 214 a DCC rate response message received from the DCC host 20 to DCC module 50 via the controller module 42 of the communication interface module 24.

The DCC module can then be operable to forward 216 the DCC rate response message via the controller module 42 of the communication interface module 24 to the sales processing module 28.

The sales processing module 28 is operable to offer 218 the DCC rate to the user 110. The sales processing module 28 is then operable to receive 220 the user's response to the DCC offer. The sales processing module 28 is operable to select a currency for the transaction based on the user's response to the DCC offer. The sales processing module 28 sends 222/224 a payment message including the selected currency to the payment system 14 via the controller module 42 of the communication interface module 24.

The payment system 14 is operable to send a credit sales message 226 to the bank system 18. In the flow shown in FIG. 5, it is assumed that a card approval message 228 is returned to the payment system 14, which then sends 230 a card approval message to the DCC module 50 via the controller module 42 of the communication interface module 24 to be processed by the DCC module 50.

The TFS module 52 is also operable to check 232, whether the user is eligible for a tax free purchase. Checking for TFS eligibility can be achieved in any appropriate manner, for example by comparing the whole or part of the credit card number to tables of credit card numbers having a currency issued for the territory of the sales processing system 12 and determining whether the card is not a locally issued card. The card details can be determined by the TFS module 52 from, for example, the information supplied from payment system 14 in the message 210 from the payment system 14 via the controller module 42 of the communication interface module 24.

The controller 42 of the communication interface module 24, in cooperation with the DCC module 50 and the TFS module 52, is then operable to forward 234 the card approval to the sales processing module 28 with a flag set if card user is TFS eligible.

The sales processing module 28 is then operable to provide 236 a receipt (for example a printed receipt) for the user with an offer to conduct the transaction as a TFS transaction if the user is eligible.

If the sales processing module 28 receives 238 confirmation that the user accepts a TFS offer made in this manner, then the sales processing module sends 240 a request via the controller 42 of the communication interface module 24 to the TFS module 52. The TFS module then sends 242 a TFS issue request via the controller 42 of the communication interface module 24 and the transaction system 16 to the TFS host system 22.

The TFS host system 22 can return 244 a TFS response message via the transaction system 16 and the controller module 24 of the communication interface module 24 to the TFS module 52. The TFS module 52 can then send 246 a TFS response including data for generating a TFS cheque via the controller module of the 42 of the communication interface module 24 to the sales processing module 28.

The sales processing module 28 can then be operable to output 248 (e.g., print) a TFS cheque for the user.

The transaction system 16 can act as a client to the TFS host system 22 using an appropriate communications protocol. The transaction protocol can be used to request refund documents in text form. The requested document can be returned as a BASE64 encoded element in an issue cheque response. Data included in the response can be returned to the sales processing module 28 without any modification by the communication interface module.

It can be seen from the above description in respect of FIG. 5, the communication interface module 24 enables the interfacing of various systems associated with a sales processing system. The provision of the communication interface module 24 means that the sales processing system manufacturer does not have to take account of all of the potential different payment systems and terminals that there are on the market, and also the additional services such as tax free shopping of dynamic currency conversion that a retailer may with to offer via third party suppliers. The sales processing system manufacturer does not need to provide data management as required, for example, to meet the Payment Card Industry Data Security Standard, as this is isolated from the sales processing system module 28 by the communication interface module 24.

An embodiment of such a communication interface module can be implemented as a computer program product comprising program code operable to control at least one processor of a sales processing system. The computer program product can comprise a computer readable medium carrying the program code.

Although the embodiments described above have been described in detail, numerous variations and modifications will become apparent to those skilled in the art once the above disclosure is fully appreciated. It is intended that the following claims be interpreted to include all such variations and modifications and their equivalents.

The invention claimed is:

1. A sales processing system, comprising:
    at least one processor configured to implement a communication interface module, the communication interface module comprising component modules including:
    a first interface module operable to support a first protocol for communication with a sales processing module of the sales processing system;
    a second interface module operable to support a second protocol for communication with a payment system;
    a third interface module operable to support a third protocol for communication with a transaction system for external services and operable to extend a communication ability of the sales processing system to the transaction system for external services, the external services including an element selected from the group consisting of a direct currency conversion host and a tax-free shopping host; and
    a routing module operable to:
    receive incoming messages from the first, second and third interface modules, the incoming messages having corresponding incoming message protocols;
    determine corresponding destinations for the incoming messages;
    transform the incoming messages into outgoing messages having corresponding outgoing message protocols, wherein the outgoing message protocols are determined based on source and destination information from the incoming messages; and
    transmit the outgoing messages to the determined destinations;
    wherein the routing module includes message type entries accessible based on message identifiers from the incoming messages, the message type entries defining respective message types; and
    wherein the routing module includes field definition entries accessible based on field identifiers from the incoming messages, the field definition entries defining contents of respective message fields.

2. The sales processing system of claim 1, wherein the routing module includes a route management module and a mapping module.

3. The sales processing system of claim 2, wherein:
    the route management module is configured to perform the receiving the incoming messages, the determining the corresponding destinations, and the transmitting the outgoing messages; and
    the mapping module is configured to perform the transforming the incoming messages.

4. The sales processing system of claim 3, wherein the mapping module is configurable using information from a configuration host system to enable transformation of different types of incoming messages.

5. The sales processing system of claim 1, wherein at least one of the component modules of the communications interface module is configurable using configuration information from a configuration host system.

6. The sales processing system of claim 1 wherein at least one of said modules comprises a computer program.

7. The sales processing system of claim 1, further comprising the sales processing module, wherein the sales processing module is operationally connected to the first interface module.

8. The sales processing system of claim 7, wherein the sales processing module is further configured to communicate with a remote server system.

9. The sales processing system of claim 7, wherein the sales processing module is configured as a sales processing terminal.

10. The sales processing system of claim 7, further comprising the payment system, wherein the payment system is operationally connected to the second interface module.

11. The sales processing system of claim 10, wherein the payment system comprises a card payment terminal.

12. The sales processing system of claim 10, further comprising the transaction system that is operationally connected to the third interface module.

13. The sales processing system of claim 10, further comprising a configuration host system that is operationally connected to the third interface module.

14. A method of operating a sales processing system, wherein the method comprises:
    controlling, by one or more processors, routing of messages between first, second and third interface modules of a communication interface module, wherein the controlling includes reformatting of the messages in accordance with first, second and third protocols, respectively, and wherein:
    the first interface module supports a first protocol for communication with a sales processing module of the sales processing system;
    the second interface module supports a second protocol for communication with a payment system; and
    the third interface module supports a third protocol for communication with a transaction system for external services, the third interface module being operable to extend a communication ability of the sales processing system to the transaction system for external services, the transaction system including an element selected from the group consisting of a direct currency conversion host and a tax-free shopping host;
    wherein routing a message between the first, second and third interface modules includes:
    receiving the message from one of the first, second and third interface modules, the message having an incoming message protocol, a message identifier usable to access a message type entry defining a respective message type, and field identifiers usable to access message field definition entries defining contents of respective message fields;
    determining, by the one or more processors, a destination for the message;
    transforming, by the one or more processors the message into an outgoing message having an outgoing message protocol, wherein the outgoing message protocol is determined based on source and destination information from the received message; and
    transmitting, by the one or more processors, the outgoing message to the determined destination.

15. The method of claim 14, further comprising configuring the communication interface module using configuration information provided from a configuration host system.

16. The method of claim 15, wherein the configuration information is provided by the configuration host system in response to a configuration initialization request identifying an implementation configuration.

* * * * *